United States Patent Office 2,949,430
Patented Aug. 16, 1960

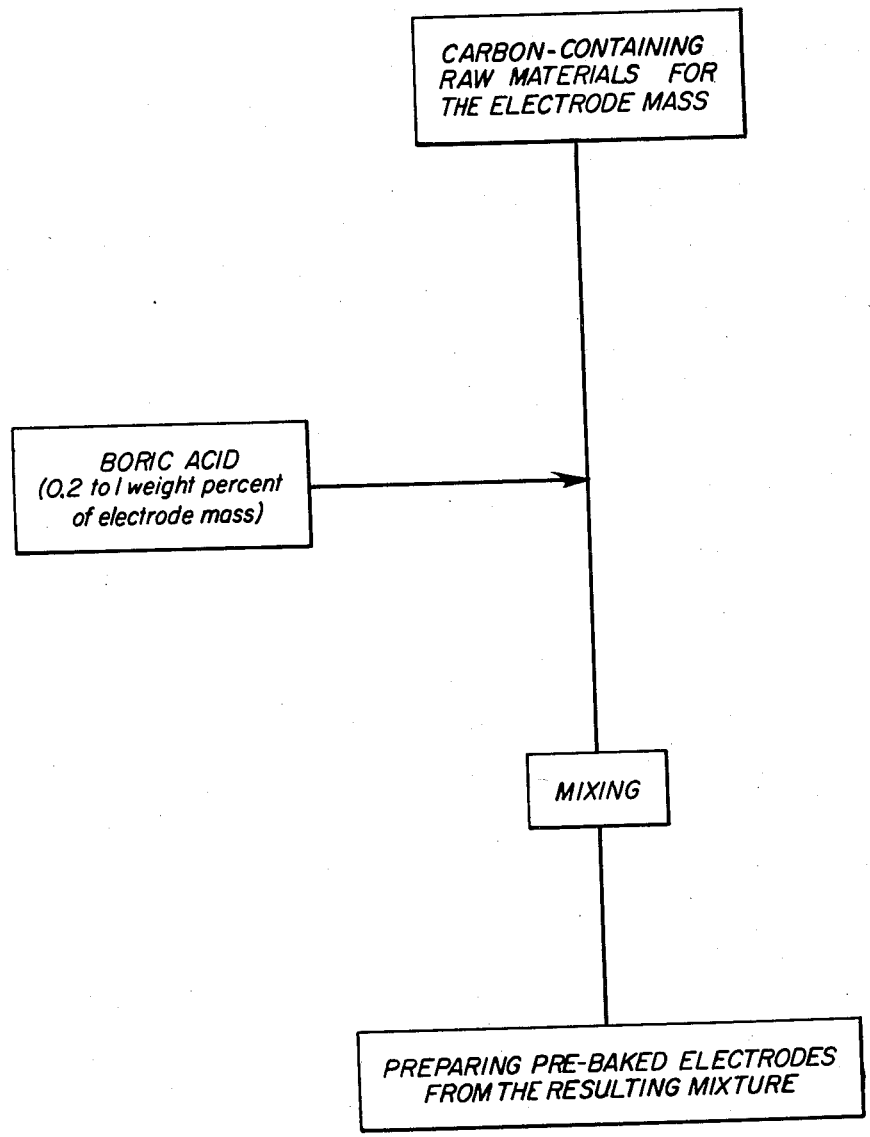

2,949,430

PROCESS FOR THE PROTECTION OF CARBON ELECTRODES FOR ELECTRIC FURNACES

Rolf Jörgensen, Ardalstangen, Norway, assignor to A/S Årdal og Sunndal Verk, Oslo, Norway Filed Aug. 2, 1957, Ser. No. 675,816

Claims priority, application Norway Aug. 7, 1956

4 Claims. (Cl. 252—502)

The invention relates to a process in which carbon electrodes, to be used in the production of aluminum by electrolysis, in the course of the manufacture are given an admixture of a substance which makes the electrode more resistant to loss by burning, and which results in a reduced consumption of the carbon electrodes at the same time as the other properties of the electrode are not unfavourably affected. Moreover, by the process an aluminum with improved properties can be obtained. Processes have earlier been proposed for protection of carbon electrodes for electric furnaces. Common to these processes is the feature that the electrode is provided with a coating on the surface or in the outer stratum of the electrode. The method is known, further, of providing the electrode with a coating which contains boron compounds, e.g. boric acid. Common to these processes is that they are essentially important in respect of pre-baked electrodes.

The object of providing electrodes with such coatings is to prevent or retard oxidization caused by the combustion of the carbon of the electrode, which comes into contact with the oxygen in the air at the usually high temperature to which the electrode is exposed in use. This loss of carbon occurs particularly at those parts of the electrode which are not submerged in the fluid melt, such, for instance, as molten aluminum. The coating is to serve as a hindrance to the access of air, and shall also serve to prevent scaling and similar effects during the handling, dispatch and storing of the electrodes.

In the case of the known proposals, which relate to an external coating on the electrodes, it is therefore per se immaterial what this coating consists of, as long as it is sufficiently impervious to oxygen and adheres sufficiently firmly on the surface, which is, however, not always the case. There is a risk that the coating will loosen and fall off, with the result that the protection aimed at ceases.

As will be understood, the use of such coatings is always associated with pre-baked electrodes.

The present invention relates to a process which is applicable to continuous, self-baking electrodes, but which can also be employed in the production of pre-baked electrodes.

The object of the invention is not only to provide a protection of the electrode during its use, as a result of which the carbon consumption of the electrode is markedly reduced, but it is also an object of the invention when using the electrode in the production of metals, especially aluminum, to make possible an evenly controlled addition of a desired substance for the electrolytic bath, in order thereby to procure a suitable treatment of the aluminum precipitated.

The present invention is based on the perception that by mixing the raw materials for making of the electrode with a boron compound, preferably boric acid, a more satisfactory protection of the electrode will be obtained than merely by the employment of a coating. It has been found that the boron compound acts on the small quantities of metals or metal compounds, especially vanadium oxide, in the electrode composition in such a way that the detrimental catalytic effect of these impurities on the combustion of carbon is retarded or prevented, which is presumably due to the fact that the boron compound, especially boric acid, forms compounds with the metallic oxides, for example, forms vanadium boride.

It has been found by experiments on a technical scale that by using electrodes which contain boron compounds pursuant to the invention, that not only is the exceedingly important advantage obtained that the consumption of electrode-composition is reduced, but a substantial reduction of the vanadium content of the aluminum is also obtained, which has significance because vanadium even in quite small amounts reduces the conductivity of aluminum. Thus by experiments it has been found that by means of the invention it is possible to reduce the vanadium content from about 0.025% to about 0.005%.

To obtain the desired effect it is important to procure an intimate mixing of the electrode raw materials and the boron compound. To attain this the boron compound is added to the calcined raw materials, which may, for example, consist of graphite, anthracite, petroleum coke, pitch coke or cinders, and these materials are crushed. The boron compound in this way is mixed with the materials before the screening, which is normally employed. The boron compound can, however, also be mixed with the screened materials before these are passed into the mixing machine or even during the heating of the materials, for example to temperatures from 100 to 170° C.

By proceeding in this way an intimate and even admixture of the boron compound is obtained in the whole electrode composition. Boric acid crystals are very brittle, so that they will be quickly crushed and distributed in the composition. The binding agent, which normally consists of coal tar pitch, is added in amounts of 20–30%, and the mixing is continued until the most uniform or homogeneous possible mass or paste is obtained. The composition, which in this way is given a content of, for example, boric acid, can be used both in the production of pre-baked electrodes or when using continuous, self-baking electrodes.

For use in the manufacture of pre-baked electrodes the mass is pressed to the desired size and shape in molds and then baked in a furnace or kiln at about 1300° C., and the electrodes are thereby ready for use.

For use in connection with self-baking electrodes the mass is in a familiar way introduced into the electrode casing or shell so that the baking takes place in the electrode itself little by little as the mass enters the hot part of the furnace. The baking temperature will in this case be the same as is used for the respective melting processes. In the case of aluminum electrolysis it is usually 950–1000° C.

Boric acid has proved to give the best results in the present process, but other boron compounds can also be used, for example borax, or boron can be added to the raw materials in the form of alkali borate, ammonium borate or in the form of organic boron compounds, such as methyl borate.

The boric acid or boron compound is introduced into the electrode materials in quantities which will depend on the chemical analysis of the raw materials used for the electrode mass. It has been found that amounts within the limit 0.2 to 1% of the weight of the electrode mass will in most cases give good results. Under normal conditions quantities of 0.2 to 0.3% have proved suitable.

If larger quantities are employed, for example several percent, drawbacks arise, the physical properties of the electrode, for example its firmness or strength, being unfavourably affected. Any substantially larger amounts, such as 1% should therefore not normally be used. This applies especially to electrode mass with the usual content of vanadium, for example about 0.03% V; if the mass has a considerably higher vanadium content, for example 0.05% or more, higher quantities of the boron compound may come into consideration.

The drawing illustrates in flow sheet form the preparation of protected carbon electrodes in accord with the present invention.

By application of the invention to the anode mass for aluminum electrolysis such a boron-containing anode mass will result in an even, controlled addition of boron to the electrolytic bath, which will have significance where it is desired to obtain a boron treatment of the precipitated aluminum.

I claim:

1. Process for the protection of carbon electrodes for electric furnaces to prevent loss of burning comprising adding boric acid in an amount of 0.2% to 1%, based on the weight of the electrode mass, to the carbon-containing raw materials for the electrode mass, mixing and evenly distributing the boric acid in said raw materials and introducing the obtained mixture into an electrode casing used for producing continuous, self-baking electrodes where the baking takes place in the electrode itself as the mass enters the hot part of the furnace.

2. Process as claimed in claim 1 wherein the boric acid is added in an amount of from 0.2% to 0.5% based on the weight of the electrode mass.

3. Process for the protection of carbon electrodes for electric furnaces to prevent loss of burning comprising adding boric acid in an amount of 0.2% to 1%, based on the weight of the electrode mass, to the carbon-containing raw materials for the electrode mass, mixing and evenly distributing the boric acid in said raw materials, pressing the obtained mixture to the desired size and shape in molds and baking the pre-formed electrode in a kiln at high temperatures, thereby producing pre-baked electrodes.

4. Process as claimed in claim 3 wherein boric acid is added in an amount of from 0.2% to 0.5% based on the weight of the electrode mass.

References Cited in the file of this patent

UNITED STATES PATENTS

| | | |
|---|---|---|
| 2,159,183 | Sem | May 23, 1939 |
| 2,252,277 | Tate et al. | Aug. 12, 1941 |
| 2,526,876 | Sejersted | Oct. 24, 1950 |
| 2,671,735 | Grisdale | Mar. 9, 1950 |
| 2,582,764 | Bailey | Jan. 15, 1952 |
| 2,695,849 | McMullen | Nov. 30, 1954 |
| 2,767,289 | Robinson | Oct. 16, 1956 |
| 2,844,544 | Ramadanoff | July 22, 1958 |